United States Patent [19]

Forbes

[11] Patent Number: 4,817,329
[45] Date of Patent: Apr. 4, 1989

[54] EXTERMINATION OF INSECTS BY HEAT

[76] Inventor: Charles Forbes, 7343 Via Lorado, Rancho Palos Verdes, Calif. 90274

[21] Appl. No.: 902,317

[22] Filed: Aug. 29, 1986

[51] Int. Cl.$^4$ .............................................. A01M 1/20
[52] U.S. Cl. .................................... 43/124; 43/132.1
[58] Field of Search ...................... 43/124, 132.1, 144, 43/107, 130

[56] References Cited

U.S. PATENT DOCUMENTS

| 919,827 | 4/1909 | Cochrane | 43/144 |
|---|---|---|---|
| 1,021,530 | 3/1912 | Johnson | 43/130 |
| 1,817,535 | 8/1931 | Spanel | 43/124 |
| 1,948,228 | 2/1934 | Urban | 43/132.1 |
| 2,196,140 | 4/1940 | Coffman | 43/124 |
| 2,469,963 | 5/1949 | Grosjean | 43/124 |
| 3,124,893 | 3/1964 | Glenn | 43/124 |
| 3,676,949 | 7/1972 | Ramsey | 43/124 |
| 3,782,026 | 1/1974 | Bridges | 43/124 |
| 4,160,336 | 7/1979 | Query | 43/132.1 |
| 4,228,124 | 10/1980 | Kashihara | 43/129 |
| 4,413,756 | 11/1983 | Kirley | 222/402.11 |
| 4,597,217 | 7/1976 | Narita | 43/125 |
| 4,637,161 | 1/1987 | Turner | 43/130 |
| 4,640,044 | 2/1987 | Varnon | 43/144 |

OTHER PUBLICATIONS

The 1PM Practitioner-Monitoring the Field of Pest Management, vol. VI, No. 10, Nov. 1980 "The Search for Alternative Treatments" Box 7414 Berkeley, Calif. 94707-0414.
"The Bedbug" Farmers Bulletin 754 U.S.D.A., Issued 10-14-16, Revised 1-1918 (Copy in Application).
C. C. Reed, Journal of Economic Entomology, vol. 45, No. 6, p. 922.
D. P. Pielou and R. F. Glasser, Canadian Journal of Zoology, vol. 32, p. 32.

Primary Examiner—Gene P. Crosby
Attorney, Agent, or Firm—Donald D. Mon

[57] ABSTRACT

A method to exterminate insects, for example termites, in situ, whose situs is embodied within an urban structure. Gases that undergo no phase changes in the temperature range between ambient and lethal temperatures are directed on the structure to heat the structure itself to a temperature that is lethal to the insects, and maintaining that temperature long enough to kill the insects.

14 Claims, 2 Drawing Sheets

EXTERMINATION OF INSECTS BY HEAT

FIELD OF THE INVENTION

This invention relates to extermination of insects in urban structures, for example termites in houses, by subjecting them to a suitably elevated temperature for a sufficient time to kill them but without harming the structures which they infest.

BACKGROUND OF THE INVENTION

This invention relates to extermination of insects by the use of heat. While it is applicable to a wide range of insect life, its most important application at the present time is in the extermination of termites in existing structures, and is an exercise in urban entymology.

All insect life, including termites, has a temperature range within which it can survive and thrive. Temperatures appreciably outside of this range are lethal, and temperatures which are outside of the range but still close to it will be lethal if maintained for a long enough period of time. The causes of death vary from insect to insect, and also are frequently temperature dependent. Very high temperatures will melt or crack the wax layer carried by many insects, and then they dehydrate and die. At lesser but still pertinent temperatures there may be a different cause of death. The precise mechanism by which the insect perishes is of no particular interest to the invention, but the fact that the insect perishes is the very point, and that it is killed without harm to the structure or to people who utilize the structure.

The use of elevated temperatures to kill insects avoids the risks and inconveniences of using toxic gases in fumigation techniques. There is no need to use anything but atmospheric air or other friendly gases, so that clean up after the process is unnecessary. The equipment is conventional and is operable by persons of few skills. Preparation for use in an occupied structure involves no more than removal of temperature sensitive material such as candles, and sometimes the placing of insulation matts.

This is a novel, effective, economical and safe means for exterminating insects.

BRIEF DESCRIPTION OF THE INVENTION

This invention is accomplished by heating a region infested by insects to a suitably elevated temperature for a time sufficient to kill the insect but without harming the structure. According to a preferred embodiment, a region to be treated is subjected to hot gases for period of time sufficient to raise the host material (the "region") temperature to the desired level, and to maintain it at that temperature for a suitable period of time. The "region" to be treated may of course be only indirectly approached by the gases themselves. For example, the inside of an infested post will not directly be contacted by the gases, but will be heated by heat conducted from a surface of the post, which is exposed to the convected air. The heated gases will then be continued in a volume such as a room or other enclosed space.

According to other useful but optional features of the invention, the hot gases may be an inert gas such as nitrogen, used with the intention of leaving a residual anoxic environment in the region after treatment. Another useful but optional feature of the invention is to utilize convection fans in the region in which the gases are provided to prevent thermal stratification that would reduce heat transfer and the thermal effects in parts of the structure.

The above and other features of this invention will be fully understood from the following detailed description and the accompanying drawings, in which:

DETAILED DESCRIPTION OF THE INVENTION

Figure 1:
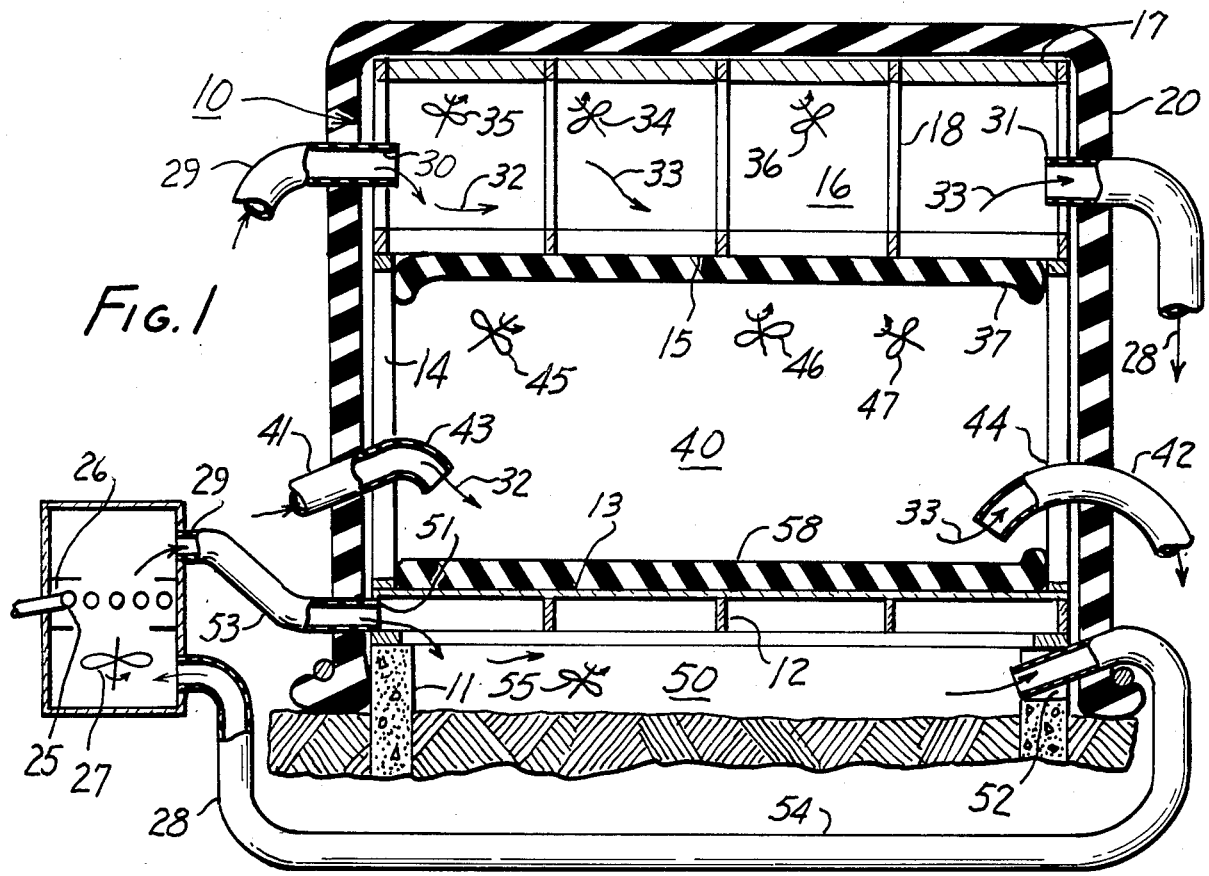
FIG. 1 is a schematic vertical cross-section of a house being treated according to the invention.

In FIG. 1 a house 10 is schematically shown having a foundation stem wall 11, joists 12, floor 13, and walls 14. A ceiling 15 is shown forming the top of the room and the bottom of an attic 16. The attic is surmounted by a roof 17. The roof shown is a conventional peaked structure supported by rafters 18 with a clear span from end to end. It is clear that this is by way of example only. The invention is applicable to all types of structures. Still another example is a building with block walls and a wooden roof.

Figure 5:
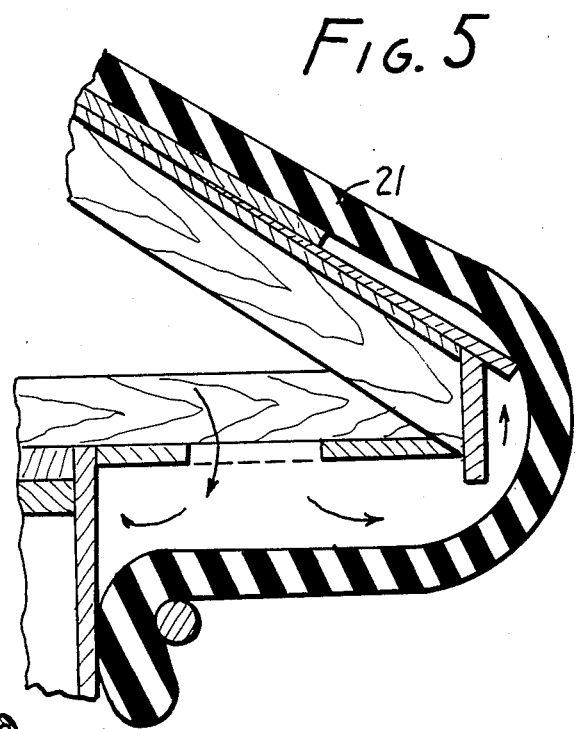
FIG. 5 is a vignette showing an optional insulating system.

The structure is shown encased in an insulation matt 20. The entire house is shown encased in the matt in FIG. 1. FIG. 5 shows only the upper portion of the house with an insulation matt 21 which extends over the roof and is curled just under the eaves. This is suffient to provide insulation for the system in the event that only the attic is being treated.

Attic treatment is shown in the upper portion of FIG. 1. A burner 25 is schematically shown having a conventional heat exchanger 26 and a blower 27. It has an inlet hose 28 and an outlet hose 29. It will be unnecessary to bring fresh air into the system during its operation. It is most economical simply to recirculate air which is already in the attic and in the heating system. For this purpose, outlet hose 29 is led to an aperture 30 in the house, perhaps a window or a vent, and the inlet hose is led to another such aperture 31. Thus, hot gas flow occurs as indicated by arrows 32 and 33. In order to avoid temperature stratification and to insure uniform heating in the attic, a group of convection fans 34, 35, 36 is placed in the attic which blow in various directions to keep the air in motion. Accordingly, there will be a flow of hot air in the enclosed attic volume which will heat the inside of the attic and the regions to be treated. The regions to be treated, namely the structure which forms the attic, will gradually be heated by these gases. After the structure has been heated to a suitable temperature and maintained there for a suitable period of time, then the supply of hot air will be discontinued.

The term "gas" is used herein to mean both a single specific gas such as nitrogen, and mixtures of gases such as air.

For optimum treatment in the attic, it usually will be found useful to provide an insulation matt 37 against the ceiling underneath the attic, which will prevent the formation of an equilibrium of temperature within the region to be treated. This will be used when only the attic is being treated, and it may not be necessary in every situation.

When a room 40 within the house is to be treated, then hoses 41 and 42 will be connected to apertures 43 and 44 in the wall, perhaps windows. Fans 45, 46, 47, will be placed as appropriate, and the process will be repeated.

Similarly, for work in the crawl space 50 under the floor or in a basement, apertures 51, 52 such as vents, will be connected to hoses 53, 54. Fan 55 will be placed in the space, and the process carried out as before. In this case insulating matts 58 may be placed upon the rug or on the floor if necessary in order to resist the formation of a equilibrium temperature within the flooring.

Figure 2:
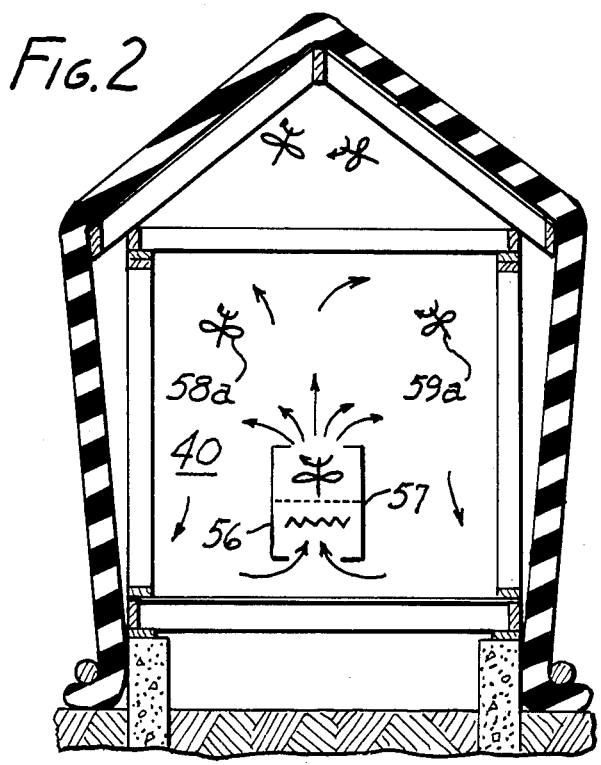
FIG. 2 is a schematic side view of FIG. 1.

FIG. 2 shows that a heater 56 such as an electric resistance heater, can be placed in the volume itself. It may be combined with a ducted fan 57 for circulation purposes as shown. Other fans 58a and 59a may be provided instead of or in addition to fan 57 as preferred.

It will be noted that the heating effect will be much more effective on the floor than on the ground beneath it. It may be necessary to maintain the temperature for a longer period of time if treatment of the ground itself is to be made using this technique.

Figure 7:
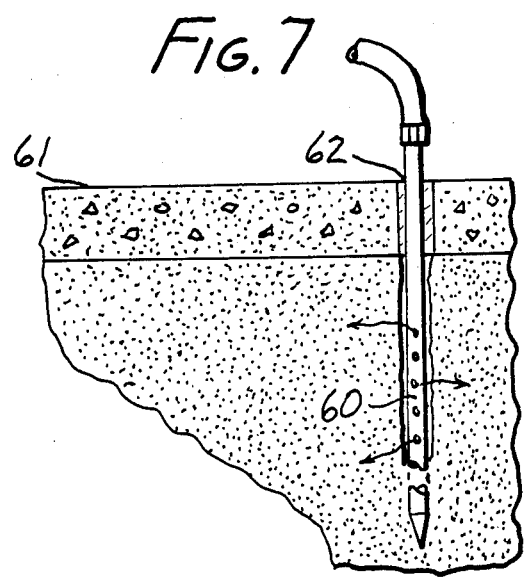
FIG. 7 is a schematic showing of the invention being used to treat the ground beneath a concrete slab.

Treatment of ground infestation, for example, structural pests, is shown in FIG. 7. A nozzle 60 is shown inserted into the ground for localized treatment. This is effective when the earth beneath a concrete slab 61 is to be treated for termites. A hole 62 is drilled through the slab and the nozzle is inserted through it into the ground. Then the gases will be injected under pressure for a suitable period of time. Migration of the gases in the ground will be relied upon for flow.

Figure 4:
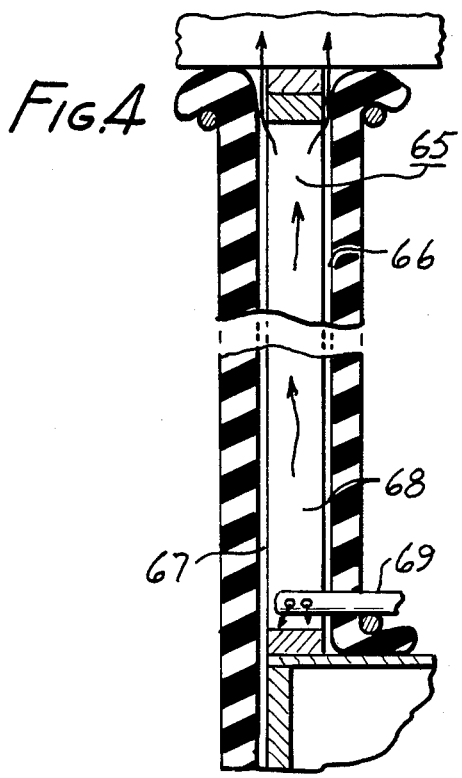
FIG. 4 shows the invention being used to treat the inside structure of a wall.

FIG. 4 shows the treatment of the inside of a wall 65 where there are two wall surfaces 66 and 67 separated by studs 68. In this case there will be an inlet aperture 69 for the hot gases, and outlet flow will be accomplished simply by leakage through the wall.

Figure 6:
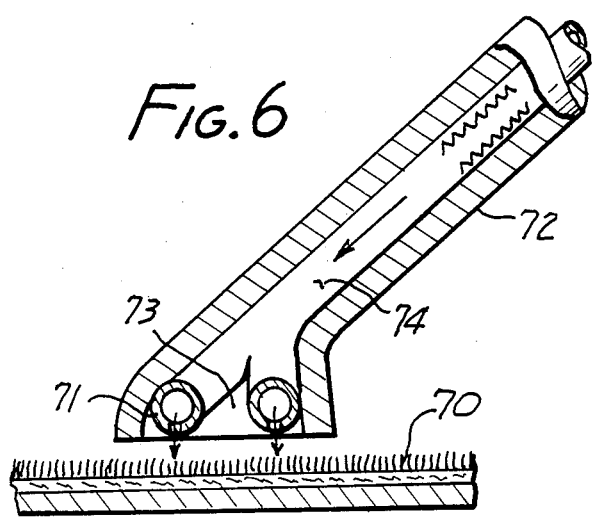
FIG. 6 shows the invention being used to kill insects such as fleas in a carpet.

FIG. 6 shows the use of heat to kill insects such as fleas in a carpet 70. A nozzle 71 mounted to a handle 72 has a chamber 73 which faces downward toward the carpet and there is an inlet hose 74 to provide hot air to it. The nozzle will be moved back and forth across the carpet at a rate and for a period of time sufficient to raise the temperature enough to kill the fleas.

Figure 3:
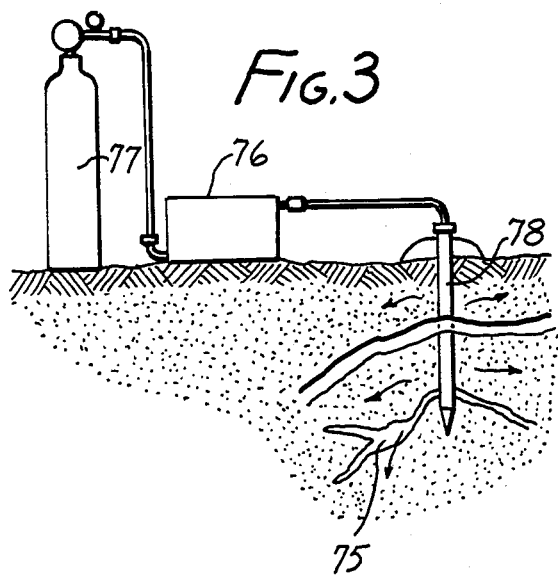
FIG. 3 shows the invention being used to exterminate insect life in the ground.

In FIG. 3 there is shown the subterranean treatment of a nest 75 of insects. Here a burner 76 is shown heating a gas such as nitrogen from a nitrogen supply 77. Either a blower may be used or a regulator from a pressurized system if the nitrogen is under pressure. Hot nitrogen or any other gas under pressure is injected into the ground through nozzle 78. The use of nitrogen has the advantage of driving out the oxygen and leaving an anoxic region behind, which itself will be lethal to further life for a residual period of time.

Figure 8:
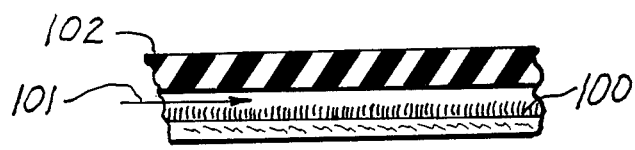
FIG. 8 is a schematic cross-section showing the invention being used to treat a rug beneath an insulating matt.

FIG. 8 shows a carpet 100 being treated by hot gases 101 injected beneath an insulating matt 102.

Figure 9:
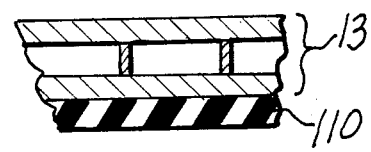
FIG. 9 is a fragmentary view of another feature of the invention.

FIG. 9 shows a means for improving the efficiency of treating floor 13. An insulating matt 110 is placed beneath it.

It will be recognized that the same source of hot gases shown in FIG. 1 can be used for all regions in the structure, and for generating hot gases for injection into the ground, and for use on surfaces such as floorings, rugs and carpets. The various hoses shown in FIG. 1 can be connected in pairs, used as individual pairs, or all at once, as desired.

It is not necessary to recirculate the air. Sometimes it may be preferred to permit hot air to leak away, and simply supply heated air at a hotter temperature or greater volume. The requirements of the individual job will dictate the choice.

Also, it is to be recognized that it is the heat from the gases, rather than the gases themselves, which accomplish the kill. To illustrate this fact, an electrical resistance heater is shown set up in house 10. It can generate heat in the room, and the fans will circulate the heated air until the region reaches the intended temperature. Therefor the provision of recirculation for gas, or even of a stream of gas, is not a limitation on the generality of this invention.

Sufficiently elevated temperatures for most insect life is surprisingly low. However low these may seem numerically, in the actual environment they are only rarely reached. This is because there is usually some shade, or some current of cooling air that prevents it. Also, many buildings are air conditioned. As to this latter feature, it should be recognized that the existing heating and cooling ducts in existing structures might advantageously be used to circulate the heated gases.

Experiments with drywood termites Incistermes Minor have shown that there are no survivors from even brief exposure to 120 degrees F. temperature. There may be some survivors at 115 degrees F., but the longer this temperature is maintained, the fewer survivors there are. At 135 degrees F., not only are there no survivors, but the insects appear to be dehydrated. Thus, 120 degrees is a sufficiently elevated temperature for a short exposure by this particular insect. A longer exposure is needed for lower temperatures, and finally there is a temperature at which no kill occurs, no matter how long the exposure. The temperatures may and do vary somewhat for various insects, and must be determined for individual species. However, the effective temperatures are surprisingly close.

The heating of structures, especially of wooden structures, takes time, and requires a thermal gradient. In order to complete the task in an economical period of time, the gas temperature must be significantly higher than the desired temperature.

An Example of practical ranges and times, a 4×4 wooden post at about 75 degrees F., exposed to convecting air at 160 degrees F. will heat the post to 120 degrees F. at its innermost point in about one hour. There is a "coasting" effect which can be utilized and allowed for, where, even if the hot gas is turned off, the temperature at the inside of the wood will continue to rise for a while. Thus, it would be possible to terminate the heating when the interior of the post is perhaps only 115 degrees F., and then to rely on the ensuing raise in temperature for the kill. Usually that will not be done, because the certainty of kill is worth a little more time and fuel.

It is acknowledged that lumber has long been exposed to high temperatures in kilns, and that heat treatment has been used on imported lumber and plywood to exclude foreign insects. However, this is an entirely different objective and this invention is an application of urban entymology, in which an environment constructed or occupied by man is to be made free from insects without adversely affecting man or structures. The almost exclusive reliance on toxic gases in fumigation procedures, or on poisonous baits and traps, are ample testimony to the fact that man has been willing to subject himself to risk in order to eradicate certain pests. With this invention, those risks are avoided. The costs of utilizing these procedures are minor and no substances deleterious to man are left behind in the structures. This invention thereby provides a safe and non-polluting technique to rid urban environments of insect life.

This invention is not to be limited by the embodiments shown in the drawings and described in the description, which are given by way of example and not of limitation, but only in accordance with the scope of the appended claims.

I claim:

1. A method of exterminating wood-destroying insects in situ whose situs is embodied at a substantial depth inside a wooden structural member of an urban structure having surfaces, said method comprising:
heating an environmentally acceptable gas which does not undergo phase change at any temperature between ambient and the temperature utilized herein, to an elevated temperature;
applying said heated gas to surfaces of said structure until the temperature of the wooden structural member at said substantial depth reaches a lethal temperature at which said insects cannot survive for a significant length of time, and maintaining said lethal temperature at said substantial depth for a period of time necessary to assure the death of said insects, said heated gas being supplied at a supply temperature higher than said lethal temperature; said application of heated gas being accomplished in such a manner that the heated gas circulates so as to provide for improved heat transfer to the surfacer of the structure and to avoid thermal stratification in the structure.

2. A method according to claim 1 in which the said lethal temperature is sufficient to quickly kill the insect.

3. A method according to claim 1 in which a said structure forms a closed volume, said volume being supplied with said heated gas to heat said volume and thereby said structure.

4. A method according to claim 3 in which hot air is the heated gas and said hot air is recirculated from and to said volume, being heated in the recirculation process.

5. A method according to claim 3 in which a heater is disposed in said volume to heat the gases therein to constitute said heated gases.

6. A method according to claim 3 in which said volume is within a wall, and in which said heated gas is injected therein.

7. A method according to claim 3 in which an insulating matt is placed atop said structure.

8. A method according to claim 3 in which an insulating matt is placed over and around said structure.

9. A method according to claim 1 in which said region is a floor.

10. A method according to claim 9 in which an insulating matt is placed beneath said floor.

11. A method according to claim 1 in which said structure has a floor, and in which an insulating mat is placed atop said floor.

12. A method according to claim 1 in which said structure has an inside ceiling, and in which an insulating matt is placed against said ceiling.

13. A method of exterminating insects in an infested region near the surface of the earth, comprising injecting into said region heated gas which does not undergo phase change at any temperature between the ambient temperature of the region and the temperatures utilized herein, said gases being injected at a temperature which is lethal to the insects and maintaining the earth of said region at a lethal temperature for at least the period of time required to kill the insects.

14. A method according to claim 13 in which said gas is nitrogen.

* * * * *